United States Patent [19]

Kofink

[11] Patent Number: 4,464,593
[45] Date of Patent: Aug. 7, 1984

[54] LIQUID COOLED COMMUTATION-TYPE DYNAMO ELECTRIC MACHINE

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 440,513

[22] Filed: Nov. 10, 1982

[30] Foreign Application Priority Data

Dec. 3, 1981 [DE] Fed. Rep. of Germany ....... 3147829

[51] Int. Cl.$^3$ ............................................. H02K 9/00
[52] U.S. Cl. ...................................... 310/58; 310/45; 310/55; 310/60 R; 310/88; 310/89; 310/233; 277/56
[58] Field of Search ....................... 310/52, 54, 55, 57, 310/58, 59, 60 R, 64, 65, 66, 88, 89, 43, 114, 45, 227, 233; 277/56, 84, 67, 68

[56] References Cited

U.S. PATENT DOCUMENTS

| | | | |
|---|---|---|---|
| 3,128,104 | 4/1964 | Teske | 277/56 |
| 3,445,695 | 5/1969 | Schultz | 310/58 |
| 3,531,668 | 9/1970 | Cathey | 310/58 |
| 3,673,447 | 6/1972 | Zumbach | 310/89 |
| 3,776,559 | 12/1973 | Cawthorn | 277/56 |
| 4,384,224 | 5/1983 | Spitler | 310/89 |

*Primary Examiner*—R. Skudy
*Attorney, Agent, or Firm*—Frishauf, Holtz, Goodman & Woodward

[57] ABSTRACT

To separate cooling fluid, such as water, from the commutator space of a dynamo electric machine, typically a motor for battery-energized vehicle, a disc (18) of insulating material is fitted on the commutator (5), terminating at its end portion in a slinger structure (20, 21) which is positioned in intergaging relation with respect to a labyrinth (21, 22) secured to the housing of the machine. Cooling fluid is admitted to the space within which all the electrical windings (3, 9) are located, so that the cooling fluid, for example water, can fill the space (28) of the housing, while being separated from the space (57) within which the commutator (5) and commutator brush holder (7) is located.

5 Claims, 1 Drawing Figure

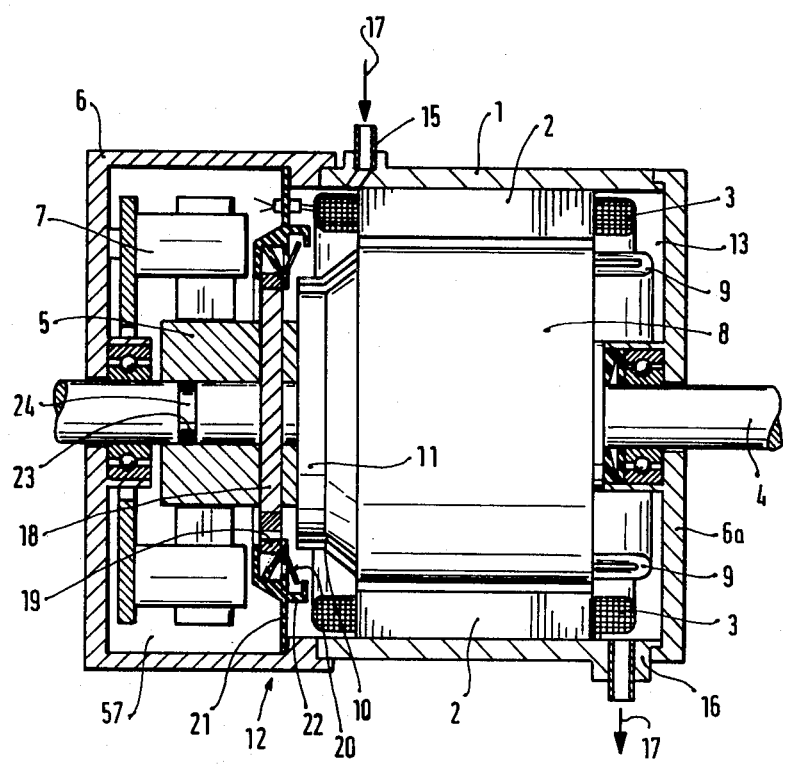

LIQUID COOLED COMMUTATION-TYPE DYNAMO ELECTRIC MACHINE

The present invention relates to a liquid cooled dynamo electric machine which has a commutator and more particularly to a structure in which the commutator is effectively isolated from cooling fluid. The dynamo electric machine is especially suitable as a drive motor for battery-energized vehicles, such as fork lift trucks, utility vehicles and the like.

BACKGROUND

Liquid cooled dynamo electric machines, and particularly such machines which utilize commutators are difficult to construct since the cooling liquid must be isolated from the commutator in order to prevent interference of the cooling liquid with the commutation. Cooling liquid can be conducted to the machine through special ducts formed within the stator, or other components of the machine structure. This, however, increases manufacturing costs and decreases the available cross-section of magnetic circuits.

THE INVENTION

It is an object to so construct a liquid cooled dynamo electric machine, particularly suitable as a drive motor for battery energized vehicles, in which the cooling liquid can wash all the rotating electro magnetic components of the machine, while being separated from the commutator, to provide for efficient cooling of those components which are most subject to heating upon loading.

Briefly, the cooling fluid is introduced within the housing portion of the machine in which the electro magnetic components are located, namely the stator and rotor. A sealing disc is provided, mounted on the commutator and rotatable therewith, to rotate in a plane transverse to the axis of the shaft. It surrounds the commutator, in sealed relation, and extends radially outwardly towards the housing. The housing is formed, or carries projections which form into engaging sealing rings with respect to the disc mounted to rotate with the commutator, projecting radially inwardly therefrom, and at least in part overlapping the sealing disc. The space within which the commutator portion is located thus is effectively isolated from the remainder of the space within the housing. The inlet and outlet openings which supply cooling liquid, and drain cooling liquid from the housing are so located that a fluid circuit is established to provide for fluid flow through the space which is remote from the commutator Preferably, fluid flow is not pressurized, but rather is by gravity, or under control of a circulating pump.

In accordance with a particularly preferred embodiment, the ring secured to the commutator is made of insulating material, and carries at its outer circumference a slinger disc portion, for example made of metal, which cooperates with the inwardly projecting rings from the stator, or the housing, respectively, to form a labyrinth sealing arrangement.

DRAWING

The single FIGURE is an axial cross-sectional view through a motor particularly adapted for a battery-energized electrical vehicle, illustrating the features of the present invention and omitting all features not necessary for an understanding thereof.

DETAILED DESCRIPTION

The commutator motor has an essentially cylindrical, tubular housing 1 within which two or more stator poles 2 are located. The stators carry field winding 3. The machine shaft 4, centrally located within the housing 1 carries a commutator 5 at one end portion thereof. The shaft is journalled in the housing by customary roller-type bearings, as shown schematically in the drawing. The commutator 5 is located beneath the end bell or shield 6. A customary brush holder 7 is provided, to hold brushes for engagement with the commutator.

The armature 8 is secured to the shaft 4, and has armature windings 9 located in slots, in accordance with well-known constructions. The end turns 10 of the windings 9 are connected to a projecting collar or flange 11 of the commutator 5, in accordance with any suitable and standard construction.

In accordance with a feature of the invention, a fluid cooling sealing arrangement 12 is provided to separate the space 57 within which the commutator 5 and the brush 7 are located from the space 28 within which the electro magnetic structure 2 of the stator and the armature 8 is located. The sealing arrangement 12 thus separates the space surrounded by the end shield or end bell surrounding the commutator from the space which includes the entire electro magnetic structure, and also the windings of the machine, namely the stator winding 3 and the armature windings 9. The space 13 adjacent to end shield 6a is connected to a drain opening 16, whereas a supply opening 15 is located closer to the space 57, but within the space 28. Cooling fluid, for example water, thus can circulate through space 13, as schematically indicated by the flow arrows 17. The flow of cooling water may be merely by gravity, by a circulating pump, or the like. The cooling fluid should not be pressurized.

In accordance with a feature of the invention, the sealing arrangement 12 includes a disc 18, made, for example, of insulating material and attached to the commutator intermediate its ends, that is, between the region of the flange or collar 11 and that zone of the commutator 5 engaged by the brushes held by brush holder 7. The disc 18 is sealingly attached on the commutator 5, and rotates therewith. It should be attached to the commutator close to the flange, or collar 11 to which the windings of the armature are attached. The drawing shows a small space, for clarity, which may be provided, but need not be. The radial end portion of the insulating disc 18 has a metallic ring 19 shrink-fitted thereon, from which a pair of radially extending slinger or spray projections extend which, for example, are spring elements and which, in cross-section, have generally V-shape. The slinger disc, or slinger strips 20, together with a sealing ring 22 projecting radially inwardly from the housing, or secured to the housing on a holder ring 21 form a labyrinth seal of the space 13 with respect to the space 57. The holder ring or disc can be secured to the commutator end shield 6 by suitable screws, or it can be clamped in position, for example by a clamping flange on the end shield 6 to clamp the disc 21 against the housing portion 1 surrounding the stator 2.

An O-ring 23, for example made of rubber or elastic plastic is fitted into a groove 24 cut into the shaft 4 to provide a tight seal of the commutator 5 with respect to the shaft 4.

OPERATION

Upon starting of the motor, cooling fluid is circulated, as schematically indicated by arrows 17. Rotation of the shaft 4, and with it the commutator 5 and disc 18 will prevent leakage and flow of fluid from space 28 into space 57 since any fluid impinging on the right side—with respect to the FIGURE—of the disc 18 and the labyrinth seal will be flung radially outwardly by centrifugal force. The insulating sealing ring 18, in combination with the labyrinth formed by the projecting interengaging portions 22 secured to the ring or disc 21, and fitting around and overlapping the slinger portion 20 of the ring 19 will effectively seal the space 57 within which the commutator is located with respect to the remaining space 28 within the housing 1.

Various changes and modifications may be made within the scope of the inventive concept.

I claim:

1. Commutator-type dynamo electric machine having a housing, including a tubular housing shell (1) and end shields (6, 6a) closing off the housing shell;
   a stator (2, 3) located within the housing shell;
   a shaft (4) journalled in the end shield;
   a rotor (8, 9) secured to the shaft;
   a commutator (5) secured to a portion of the shaft adjacent one of the end shields;
   a cooling fluid (17) inlet opening (15) and an outlet opening (16) formed in the housing to establish a cooling fluid circuit into the interior of the housing in the region of the stator and rotor thereof;
   and comprising, in accordance with the invention
   means (12) for separating cooling fluid within the housing from the space (57) therein in which the commutator (5) is located from the space (28) in which the stator (2) and the rotor (8) are located, including
   a sealing disc (18) of insulating material mounted on the commutator and rotating therewith in a plane transverse to the axis of the shaft, and sealingly surrounding the commutator, and extending radially towards the housing,
   a stationary sealing ring (20, 21) interengaging with the sealing disc, projecting radially inwardly from the housing and at least in part overlapping the sealing disc (18) to separate the space (57), within which the commutation is positioned from the remainder of the space (28) within the housing, the inlet and outlet openings (15, 16) being located in a region of said remainder of the space (28) and terminating therein, to establish fluid circuit throughout said remainder of the space of the housing only; and
   a slinger disc (20) secured to the outer circumference of the insulating disc.

2. Machine according to claim 1 wherein the space is entirely subjected to the cooling fluid within the cooling fluid circuit, and includes all electric current carrying winding portions of the dynamo electric machine.

3. Machine according to claim 1 wherein said slinger disc comprises a metallic ring (19).

4. Machine according to claim 3 wherein said metallic ring carries radially projecting ring elements which, in cross-section, form a V-structure;
   and said sealing ring (20, 21) comprises a labyrinth structure interengaging and overlapping with respect to the ring elements, and having a portion projecting between the space defined by the V-structure.

5. Machine according to claim 4 wherein the commutator has radially projecting flange portions for attachment to windings (9) of the rotor;
   and wherein said insulating sealing disc (18) is located between said radially projecting flange portions of the commutator and portions of the commutator engaged by current connecting brushes.

* * * * *